(12) United States Patent
Iwasaki

(10) Patent No.: US 10,403,899 B2
(45) Date of Patent: Sep. 3, 2019

(54) ALLOY AND LITHIUM ION BATTERY

(71) Applicant: HITACHI, LTD., Tokyo (JP)

(72) Inventor: Tomio Iwasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 329 days.

(21) Appl. No.: 15/522,224

(22) PCT Filed: Oct. 31, 2014

(86) PCT No.: PCT/JP2014/079016
§ 371 (c)(1),
(2) Date: Apr. 26, 2017

(87) PCT Pub. No.: WO2016/067439
PCT Pub. Date: May 6, 2016

(65) Prior Publication Data
US 2017/0317355 A1    Nov. 2, 2017

(51) Int. Cl.
| | | |
|---|---|---|
| H01M 4/66 | (2006.01) | |
| C22C 30/02 | (2006.01) | |
| C22C 30/04 | (2006.01) | |
| H01M 10/0525 | (2010.01) | |
| C22C 30/00 | (2006.01) | |

(52) U.S. Cl.
CPC ............ *H01M 4/662* (2013.01); *C22C 30/00* (2013.01); *C22C 30/02* (2013.01); *C22C 30/04* (2013.01); *H01M 10/0525* (2013.01)

(58) Field of Classification Search
CPC ......... C22C 30/00; C22C 30/02; C22C 30/04; H01M 10/0525; H01M 4/662
See application file for complete search history.

(56) References Cited

U.S. PATENT DOCUMENTS 6,306,544 B1 * 10/2001 Frysz .................. C22C 19/07
420/38

FOREIGN PATENT DOCUMENTS

| JP | 2002-173732 A | 6/2002 |
|---|---|---|
| JP | 2005-325413 A | 11/2005 |
| JP | 2013-001982 A | 1/2013 |
| WO | 2013/175715 A1 | 11/2013 |

OTHER PUBLICATIONS

Journal of Physics: Condensed Matter vol. 16 (2004) SA29-SA53.
(Continued)

*Primary Examiner* — Sarah A. Slifka
*Assistant Examiner* — Brent C Thomas
(74) *Attorney, Agent, or Firm* — Volpe and Koenig, P.C.

(57) ABSTRACT

Provided is an alloy comprising eight or more types of constituent elements, wherein the relative difference in terms of distance between nearest neighbors DNN between a constituent element having the largest distance between nearest neighbors DNN when constituting a bulk crystal from a single element and a constituent element having the smallest distance between nearest neighbors DNN when constituting a bulk crystal from a single element is 9% or less, the number of constituent elements having the same crystal structure when constituting a bulk crystal from a single element is not more than 3, and the difference in concentration between the constituent element having the highest concentration and the constituent element having the lowest concentration is 2 at. % or lower.

7 Claims, 15 Drawing Sheets

(56) References Cited

OTHER PUBLICATIONS

Introduction to Solid Physics, 1st vol., 5th Edition, Charles Kittel, joint translators (Yoshikiyo Uno and three others), Maruzen Co., Ltd. 1978 Issue.
International Search Report for WO 2016/067439 A1, dated Feb. 3, 2015.

* cited by examiner

INSIDE OF CRYSTAL GRAIN A    CRYSTAL GRAIN BOUNDARY    INSIDE OF CRYSTAL GRAIN B

ALLOY AND LITHIUM ION BATTERY

TECHNICAL FIELD

The present invention relates to an alloy and a lithium ion battery.

BACKGROUND ART

In recent years, lithium ion batteries with high output and high energy density have drawn attention as consumer electric device power sources such as mobile phones. Further, the application of such lithium ion batteries to driving power sources such as ships, railroads, and automobiles has been desired. A lithium ion battery includes a positive electrode and a negative electrode which can occlude/discharge lithium ions and a separator in a container. The positive electrode and the negative electrode include a metal plate such as an aluminum foil or a copper foil, a positive electrode active material, and a negative electrode active material. As the positive electrode active material, a lithium cobalt oxide ($LiCoO_2$) having a laminar rock salt structure, powder made of an oxide of lithium and a transition metal where a part or all of cobalt atoms of the lithium cobalt oxide is replaced with nickel or manganese or the like is used, for example. Carbon or the like has been used for the negative electrode active material.

CITATION LIST

Patent Literature

PTL 1: Japanese Patent Laid-Open No. 2013-1982
PTL 2: International Publication No. 2013/175715

Non Patent Literature

NPL 1: JOURNAL OF PHYSICS: CONDENSED MATTER Vol. 16 (2004) S429-S453
NPL 2: Introduction to Solid Physics, 1st Vol., 5th Edition, Charles Kittel, joint translators (Yoshikiyo Uno and three others), Maruzen Co., Ltd., 1978 issue

SUMMARY OF INVENTION

Technical Problem

An electrode plate of a lithium ion battery is coated with an electrode active material. The active material expands and contracts during charge/discharge according to the movement of ions from the active material, and the electrode plate repeatedly receives a load per charge/discharge. This causes the partial breakage of the electrode plate, which leads to the life shortening of the battery. In PTL 1, in order to prevent the life shortening, the use of a rolled copper foil having large breaking elongation as an electrode plate is proposed. However, as shown also in PTL 2, a silicon-containing substance is used as an active material which more largely expands and contracts than an active material such as graphite to be conventionally used, with the higher capacity of the lithium ion battery, which causes the necessity of further increasing the breaking elongation of the electrode plate.

Then, it is an object of the present invention to provide an alloy having large breaking elongation and used for an electrode plate or the like so that the electrode plate is not broken even if the electrode plate and an active material are elongated or shrunk during the charge/discharge of lithium ion battery.

Solution to Problem

In order to solve the problem, the configurations described in the claims are adopted, for example.

Advantageous Effects of Invention

According to the present invention, an alloy which can be used for a high-capacity lithium ion battery or the like and has large breaking elongation can be provided.

BRIEF DESCRIPTION OF DRAWINGS

FIG. 10 is a third view showing the simulation results of a diffusion coefficient in the crystal grain boundary of the alloy.

DESCRIPTION OF EMBODIMENTS

As a result of considering means for obtaining a metal having large breaking elongation, the inventors found that the use of an amorphous metal as a metal having no crystal grain boundary causing breakage exhibited a certain level of validity as one means. However, the inventors found that, when a load causing elongation or shrinkage such as charge/discharge was applied to the amorphous metal, the amorphous metal was gradually crystallized to be broken by small elongation from the crystal grain boundary. The inventors found that, when a single crystal metal was used as another metal having no crystal grain boundary, a force (stress) for causing breakage was increased, but the breaking elongation of the single crystal metal was smaller than that of the amorphous metal. Then, as a result of an intensive study to increase the breaking elongation of a polycrystal metal instead of the amorphous metal or the single crystal metal, the inventors eliminated a cause for decreasing breaking elongation in a conventional polycrystal metal, i.e., the lowness of the atom density of the crystal grain boundary, and found an alloy composition capable of increasing the atom density of the crystal grain boundary.

Hereinafter, Examples of the present invention will be described with reference to the drawings.

Example 1

An alloy of the present Example contains eight or more types of constituent elements. A relative difference in terms of nearest neighbor interatomic distances $D_{NN}$ between a constituent element having the largest nearest neighbor interatomic distance $D_{NN}$ when constituting a bulk crystal from a single element and a constituent element having the smallest nearest neighbor interatomic distance $D_{NN}$ when constituting a bulk crystal from a single element is 9% or less. In addition, the number of elements having the same crystal structure when constituting a bulk crystal from a single element is not more than 3, and more preferably not more than 2, and a relative difference in concentration between the constituent element having the highest concentration and the constituent element having the lowest concentration is 2 at. % or lower.

Figure 1:
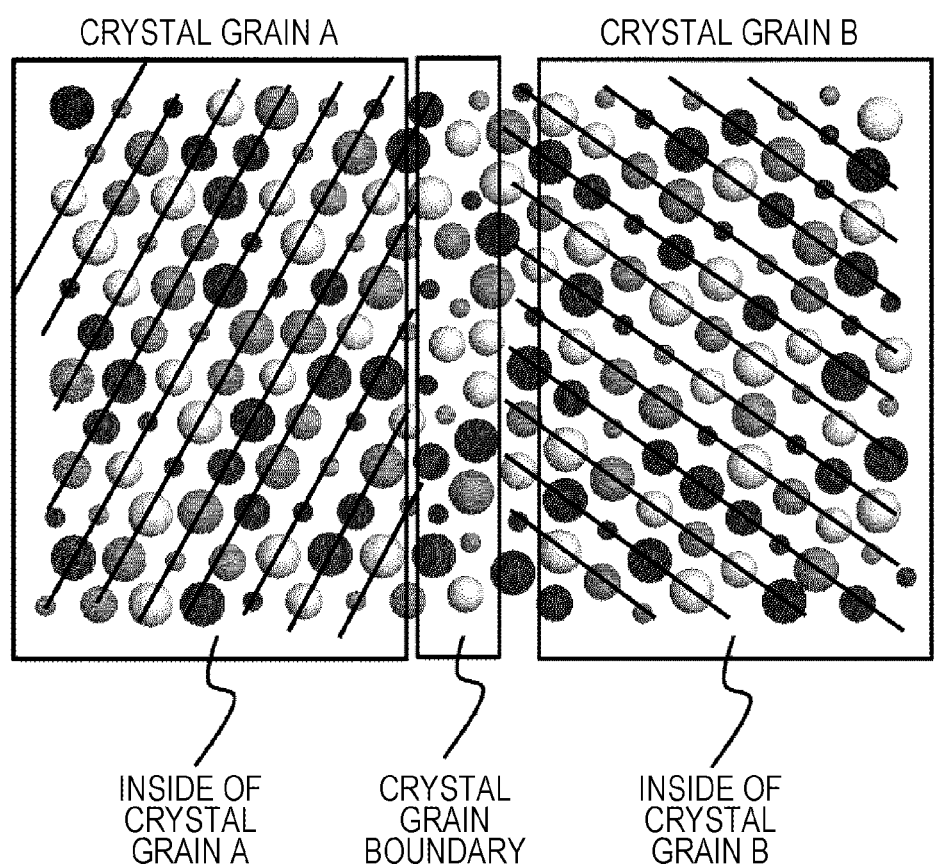
FIG. 1 shows arrangement of atoms near a crystal grain boundary of an alloy according to a first embodiment.

Specifically, the eight types of constituent elements are Cu, Ni, Fe, Cr, Co, Ge, Ga, and Si, and the concentration of each of the constituent elements is 11.5 to 13.5 at. %. As shown in FIG. 1, by this alloy composition, an atom density in a crystal grain boundary could be set to 98% or more of that in a crystal grain. In the figures shown herein, differences in color and size between spheres representing atoms express the types of the atoms.

The background to the obtention of such an effective alloy composition will be described. Since only a limited crystal structure was allowed in a crystal grain boundary of FIG. 2 in the case of a conventional polycrystal metal, only arrangement of atoms matching both the orientation of a left side crystal grain and the orientation of a right side crystal grain in the crystal grain boundary of FIG. 2 was allowed. Since the number of such arrangement of atoms was small, the atom density in the crystal grain boundary was less than 98% of that in the crystal grain. The position of X in the crystal grain boundary of FIG. 2 matches the position of a crystal grain B located on the right side in FIG. 2. However, since the position of X is too close to a crystal grain A located on the left side, and receives a repulsion force, the position of X is a position at which an atom cannot be arranged.

From the reason, the atom density in the crystal grain boundary was less than 98% of that in the crystal grain. Then, in various alloy compositions, molecular dynamics simulation shown in NPL 1 was conducted, to obtain the atom density in the crystal grain and the atom density in the crystal grain boundary under an equilibrium condition at room temperature (20° C.). The percentage of the atom density in the crystal grain boundary to the atom density in the crystal grain was analyzed. Breaking elongation and a diffusion coefficient in tension deformation were also calculated. Herein, in consideration of the heat generation of a lithium ion battery and the possibility that a place to be used is in a high temperature state, an alloy having a melting point equal to or higher than that of aluminum (660.3° C.) will be selected without causing deterioration in heat resistance, and described.

Figure 3:
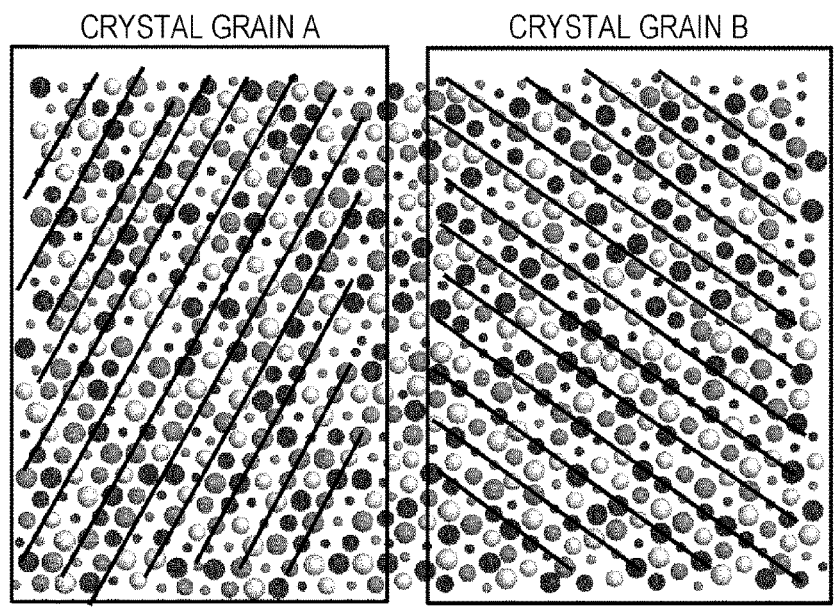
FIG. 3 is a sectional view showing arrangement of atoms in a calculation model of molecular dynamics simulation.

A calculation model shown in FIG. 3 was used. Only two-dimensional atoms are denoted in FIG. 3. The calculation model is a three-dimensional model in which the number of the atoms arranged in a depth direction in a plane of paper is the same as that of the atoms arranged a transverse direction in the plane of paper. The number of the atoms in the calculation model is 32480. Using random numbers, the initial positions of the atoms in calculation were arranged so that elements were uniformly dispersed. After this arrangement, a temperature was set to room temperature (20° C.), and the atom density and the diffusion coefficient in the crystal grain and the crystal grain boundary were calculated under an equilibrium condition. Tension deformation was applied to atoms in the leftmost and rightmost ends, and critical elongation causing breakage, i.e., breaking elongation was calculated.

Thus, as a result of the simulation, it was found that, when a plurality of elements in which the relative difference in terms of nearest neighbor interatomic distances $D_{NN}$ (for example, values published in p. 28 of NPL 2) when constituting a bulk crystal from a single element was more than 9% were included, strain in the crystal grain was increased to cause disordered arrangement, and the arrangement of atoms in the crystal grain boundary was also disordered under this influence, whereby the atom density in the crystal grain boundary was 82% or less of the atom density in the crystal grain.

In this case, the breaking elongation was also accordingly decreased. Then, the plurality of elements in which the relative difference in terms of nearest neighbor interatomic distances $D_{NN}$ when constituting a bulk crystal from a single element was 9% or less were included. However, it was found that, when the number of types of elements was 7 or less, at least one type of element having a large concentration per one type of 14 at. % or more was present, and thereby the elements having a large concentration gathered near the crystal grain boundary (so-called segregation occurred), which caused non-uniform strain dispersion, as a result of which the breaking elongation was not increased.

Then, it was found that, when the eight or more types of elements in which the relative difference in terms of nearest neighbor interatomic distances $D_{NN}$ when constituting a bulk crystal from a single element was 9% or less were included so that the concentration per one type of element was less than 14 at. %, strain and segregation were not increased to approach a preferable alloy. However, even in this case, it was found that, when four or more types of elements having the same crystal structure when constituting a bulk crystal from a single element among the eight or more types of constituent elements were included, the crystal structure was disproportionately present near the crystal grain boundary, to cause non-uniform strain dispersion, as a result of which the breaking elongation was not increased.

Thus, it was found that an alloy composition effectively increased the breaking elongation, and contained eight or more types of constituent elements, wherein a relative difference in terms of nearest neighbor interatomic distances $D_{NN}$ between a constituent element having the largest nearest neighbor interatomic distance $D_{NN}$ when constituting a bulk crystal from a single element and a constituent element having the smallest nearest neighbor interatomic distance $D_{NN}$ when constituting a bulk crystal from a single element was 9% or less, the number of elements having the same crystal structure when constituting a bulk crystal from a single element was not more than 3, and more preferably not more than 2, and the concentration of each of the constituent elements was less than 14 at. %.

The reason why the alloy composition increases the breaking elongation is that the segregations of the same element and the same crystal structure do not occur in the crystal grain boundary to disperse the strain, and the atom density in the crystal grain boundary is 98% or more of the atom density in the crystal grain to suppress the breakage in the crystal grain boundary.

Figure 2:
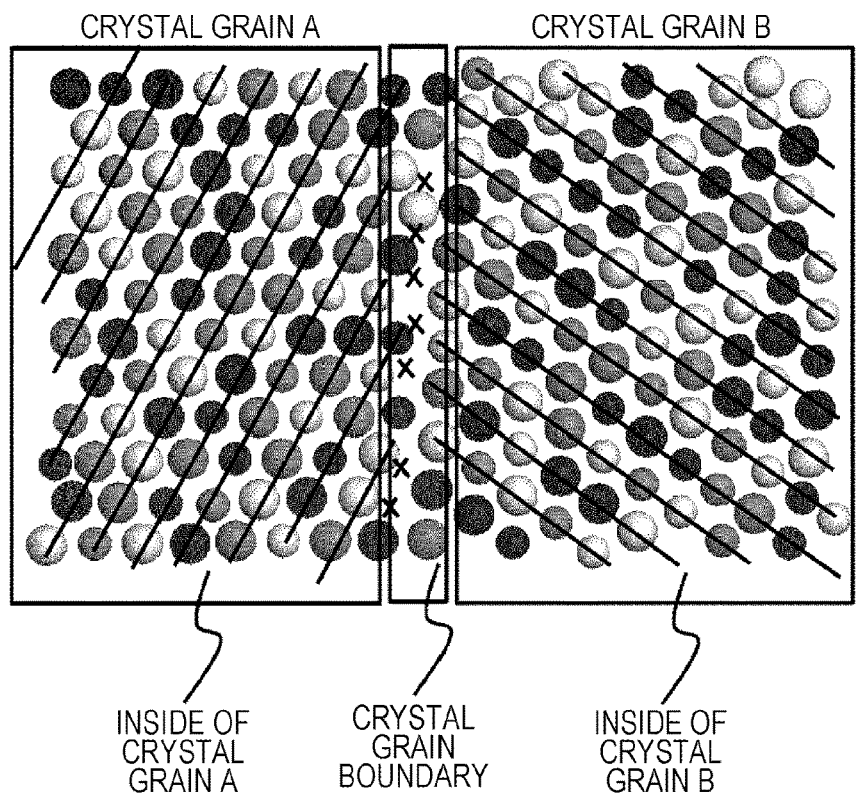
FIG. 2 shows arrangement of atoms near a crystal grain boundary of a conventional alloy.
Figure 4:
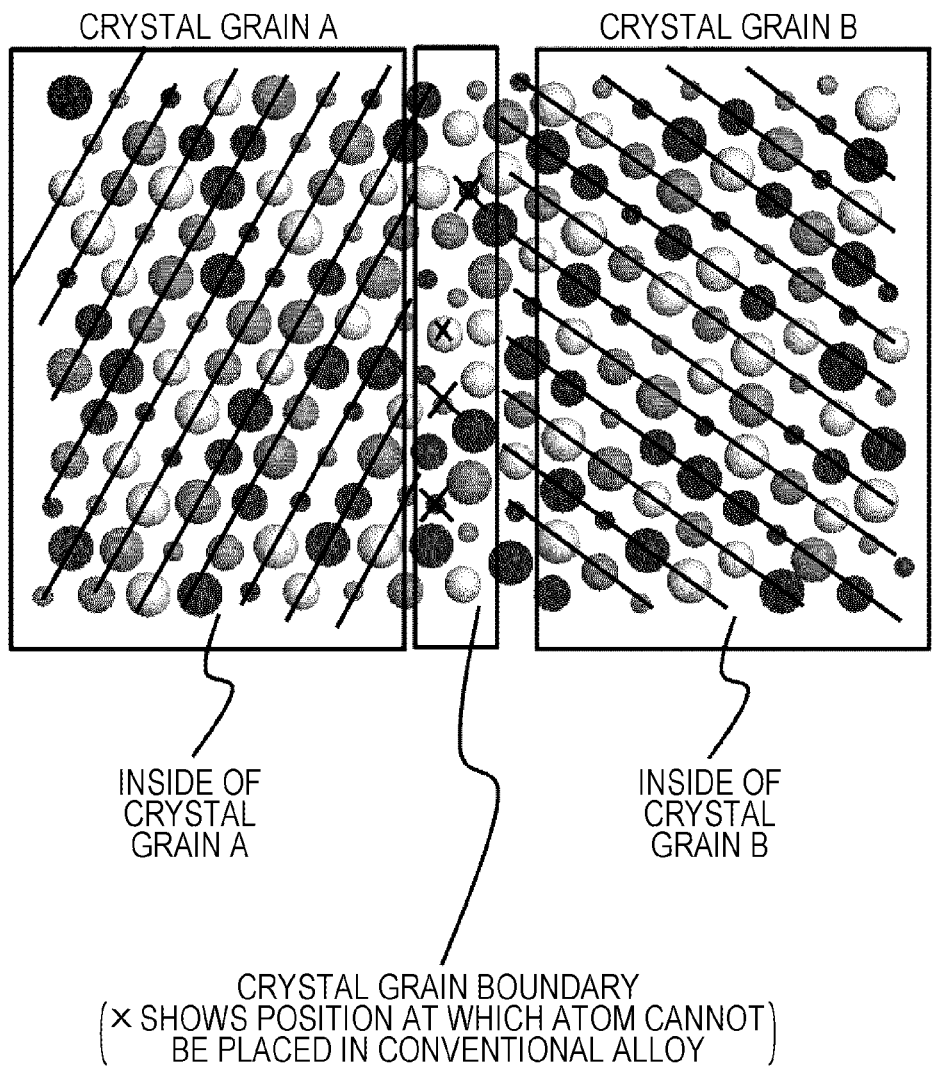
FIG. 4 shows the feature of the arrangement of atoms near the crystal grain boundary of the alloy according to the first embodiment.

This situation will be described using FIGS. 2 and 4 partially enlarging and denoting examples of the calculation results. As described above, in the case of the conventional polycrystal metal, in the crystal grain boundary of FIG. 2, only the limited crystal structure was allowed. Therefore, only the arrangement of atoms matching both the orientation of the left side crystal grain and the orientation of the right side crystal grain in the crystal grain boundary of FIG. 2 was allowed. Since the number of atoms was few in such arrangement of atoms, the atom density in the crystal grain boundary was less than 98% of that in the crystal grain.

On the other hand, since elements having various crystal structures are evenly dispersed in the alloy of the present Example, the alloy of the present example is in a state where the element having a different crystal structure from that in the crystal grain is allowed to be placed in the crystal grain boundary. That is, it is not necessary to set the arrangement of atoms matching the arrangements of the crystal grain A and the crystal grain B of FIG. 2. By combining elements having various crystal structures, the atoms can be placed also at the position of X of FIG. 2 without receiving a repulsion force. In FIG. 4, X is described at a position at which atoms cannot be placed in the conventional alloy, but in the case of the alloy of the present Example, the atoms can be placed also at the position of X. Thus, since the atoms can be arranged in a densification form also in the crystal grain boundary, the movement (atomic diffusion) of the atoms in the crystal grain boundary is suppressed, which causes an increase in the breaking elongation.

Figure 5:
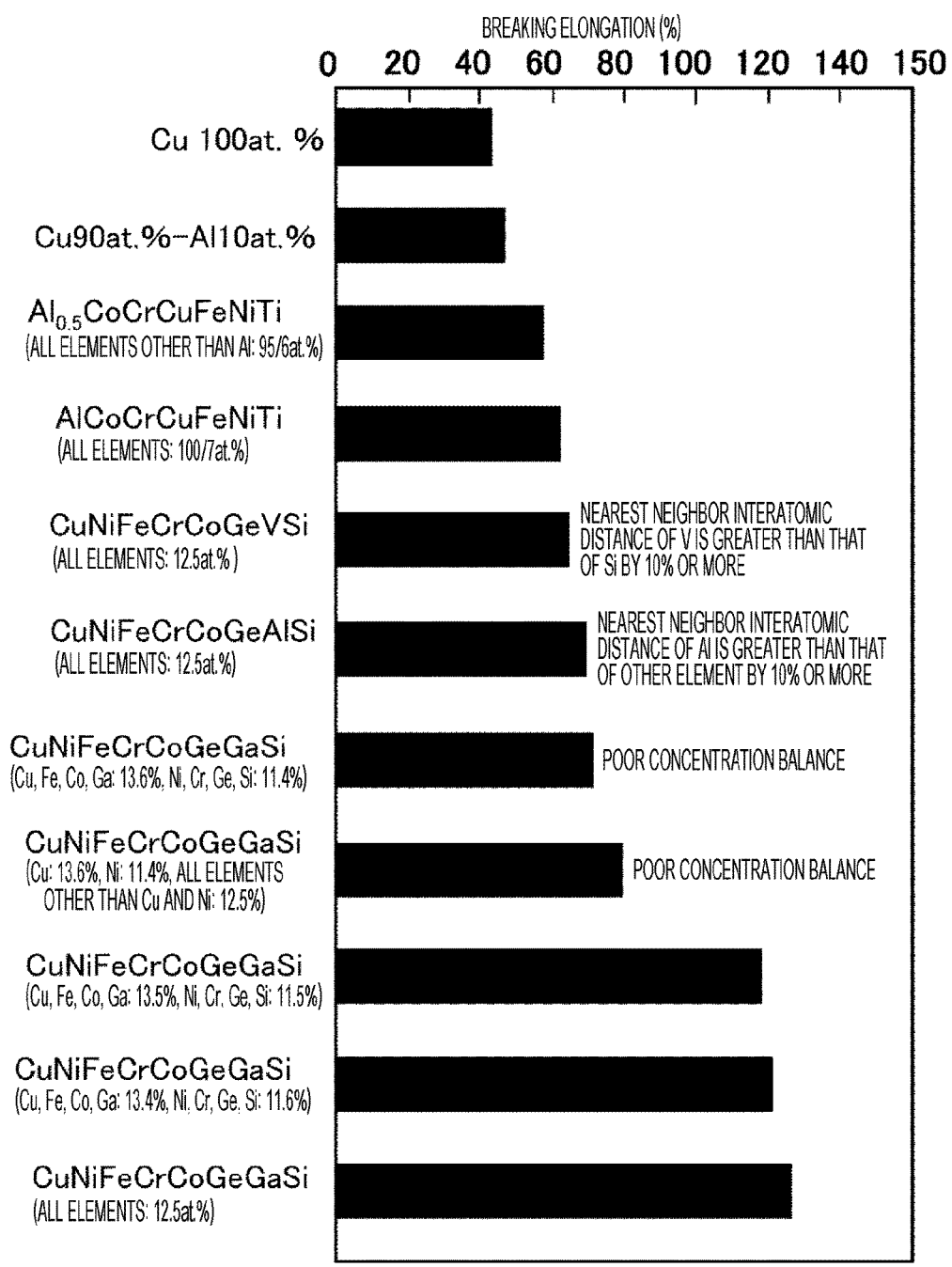
FIG. 5 is a first view showing the simulation results of the breaking elongation of the alloy.

These effects will be described in detail by illustrating the results of the molecular dynamics simulation. FIG. 5 shows that eight types of constituent elements Cu, Ni, Fe, Cr, Co, Ge, Ga, and Si are set, and the concentrations of the constituent elements are different to provide different breaking elongations. From FIG. 5, it is found that the concentration of each of the constituent elements is 12.5 at. %, which can maximize the breaking elongation (lowermost graph in bar graphs). It is found that, when the concentration of each of the same eight types of constituent elements is 11.5 at. % to 13.5 at. %, that is, when the difference in concentration between the constituent elements having the smallest concentration is 2 at. % or lower, the breaking elongation is effectively increased (second and third graphs from the bottom in bar graphs).

However, from FIG. 5, it is found that, when the highest concentration of the constituent elements is more than 13.5 at. % and the lowest concentration is less than 11.5 at. %, the breaking elongation is decreased. In this case, the segregation of the element having the highest concentration near the crystal grain boundary is caused to decrease the breaking elongation.

Figure 6:
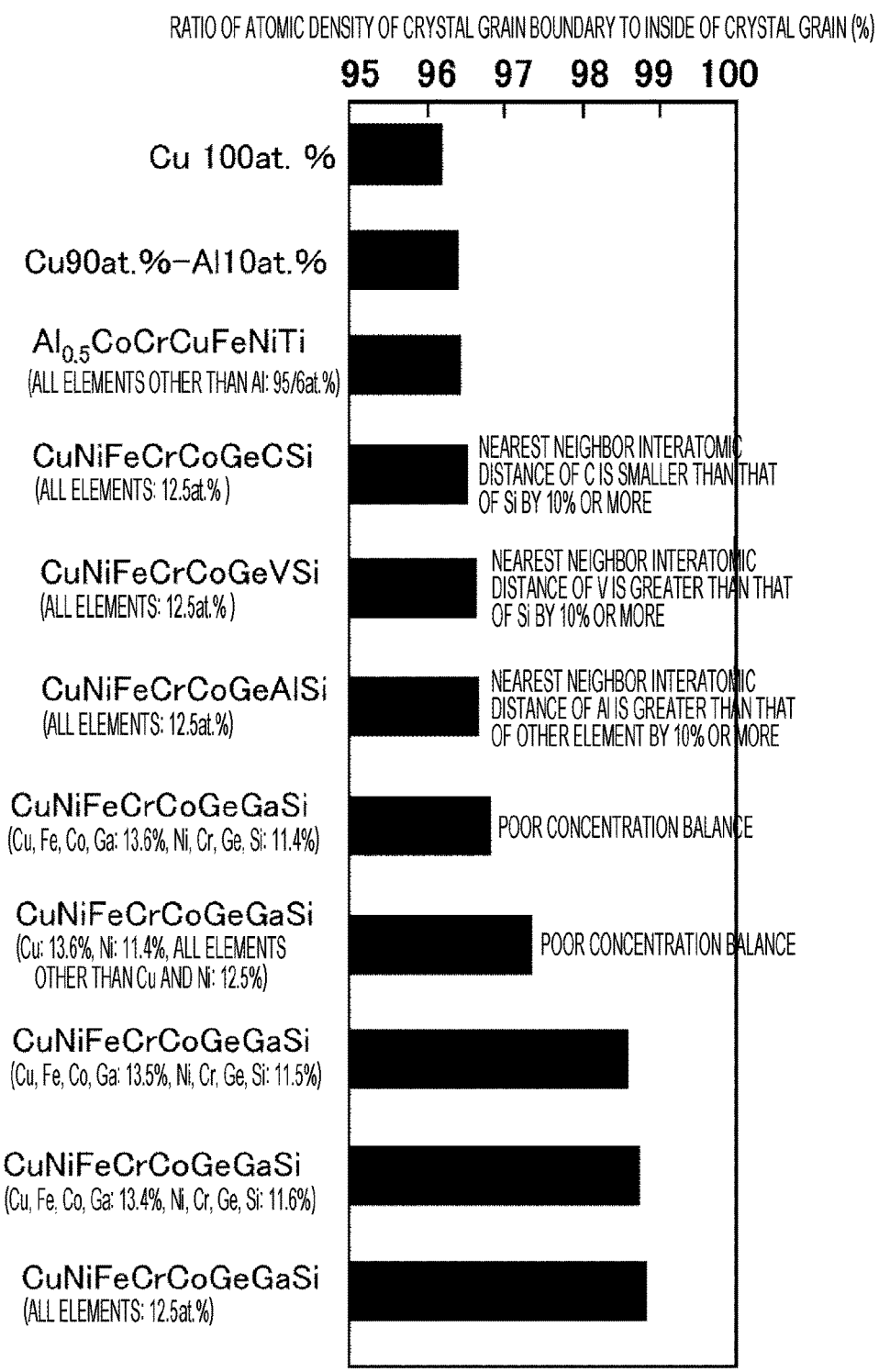
FIG. 6 is a first view showing simulation results obtained by calculating a ratio of the atom density of a crystal grain boundary to the inside of a crystal grain.
Figure 7:
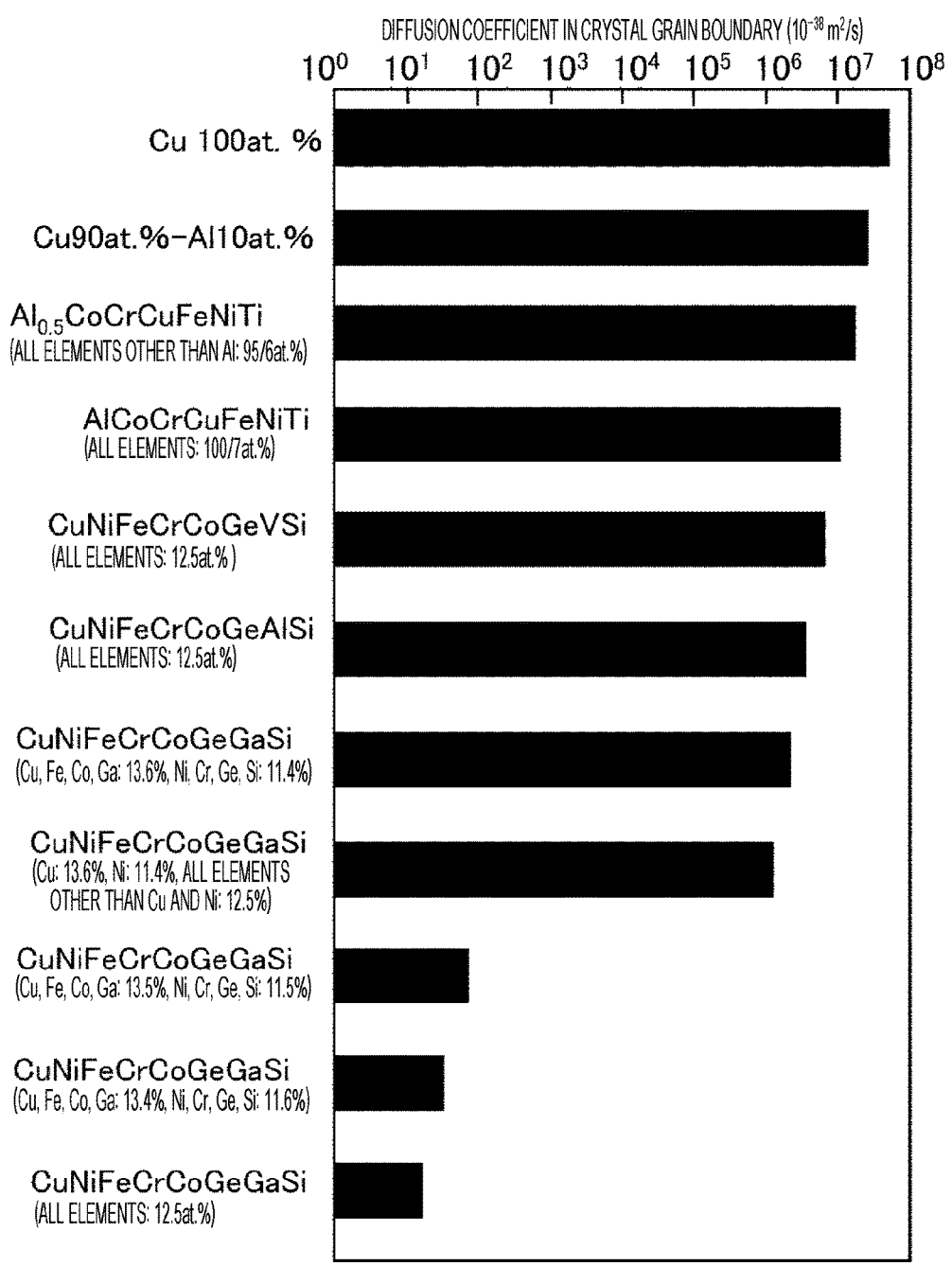
FIG. 7 is a first view showing the simulation results of a diffusion coefficient in the crystal grain boundary of the alloy.

FIG. 6 shows the percentage of the atom density in the crystal grain boundary to the atom density in the crystal grain. When FIG. 6 is made to correspond to FIG. 5, it is also found that, as the value of the atom density is increased, the breaking elongation is increased. FIG. 7 shows the results of obtaining the diffusion coefficient of the atom in the crystal grain boundary from the Einstein's relationship described in p. S440 of NPL 1. From the comparison of the results (FIG. 7) with FIG. 5 and FIG. 6, it is found that an increase (densification) in the atom density in the crystal grain boundary to allow atomic diffusion to be suppressed provides an increase in the breaking elongation.

The crystal structures of the eight types of constituent elements Cu, Ni, Fe, Cr, Co, Ge, Ga, and Si when constituting a bulk crystal from a single element are respectively fcc, fcc, bcc, bcc, hcp, diamond, complex, and diamond in order, as described in p. 27 of NPL 2. fcc represents a face-centered cubic structure; bcc represents a body-centered cubic structure; hcp represents a hexagonal close packed structure; diamond represents a diamond structure; and complex represents a complex structure. As described above, since the elements having five types of crystal structures are arranged in the crystal grain boundary, the atom density in the crystal grain boundary can be increased, and the breakage in the crystal grain boundary can be suppressed, which provides an effect of increasing the breaking elongation.

The nearest neighbor interatomic distances DNN of the eight types of constituent elements Cu, Ni, Fe, Cr, Co, Ge, Ga, and Si when constituting a bulk crystal from a single element are respectively 2.56, 2.49, 2.48, 2.50, 2.50, 2.45, 2.44, and 2.35 (unit: angstrom) in order, as described in p. 28 of NPL 2. The relative difference in terms of the largest and smallest nearest neighbor interatomic distances DNN is 9% or lower. This suppresses the strain in the crystal small, and provides the ordered arrangement of atoms. When Al having a large nearest neighbor interatomic distance DNN of 2.86 A, V having a large nearest neighbor interatomic distance DNN of 2.62 A, or C having a small nearest neighbor interatomic distance DNN of 1.54 A is replaced with any of the above eight types as shown also in FIG. 5, FIG. 6, and FIG. 7, the breaking elongation is decreased. Thus, when the relative difference between the largest and smallest nearest neighbor interatomic distances DNN is more than 9%, the strain is increased to cause the disordered arrangement of atoms, and thereby an effect of decreasing the breaking elongation is lost.

Figure 8:
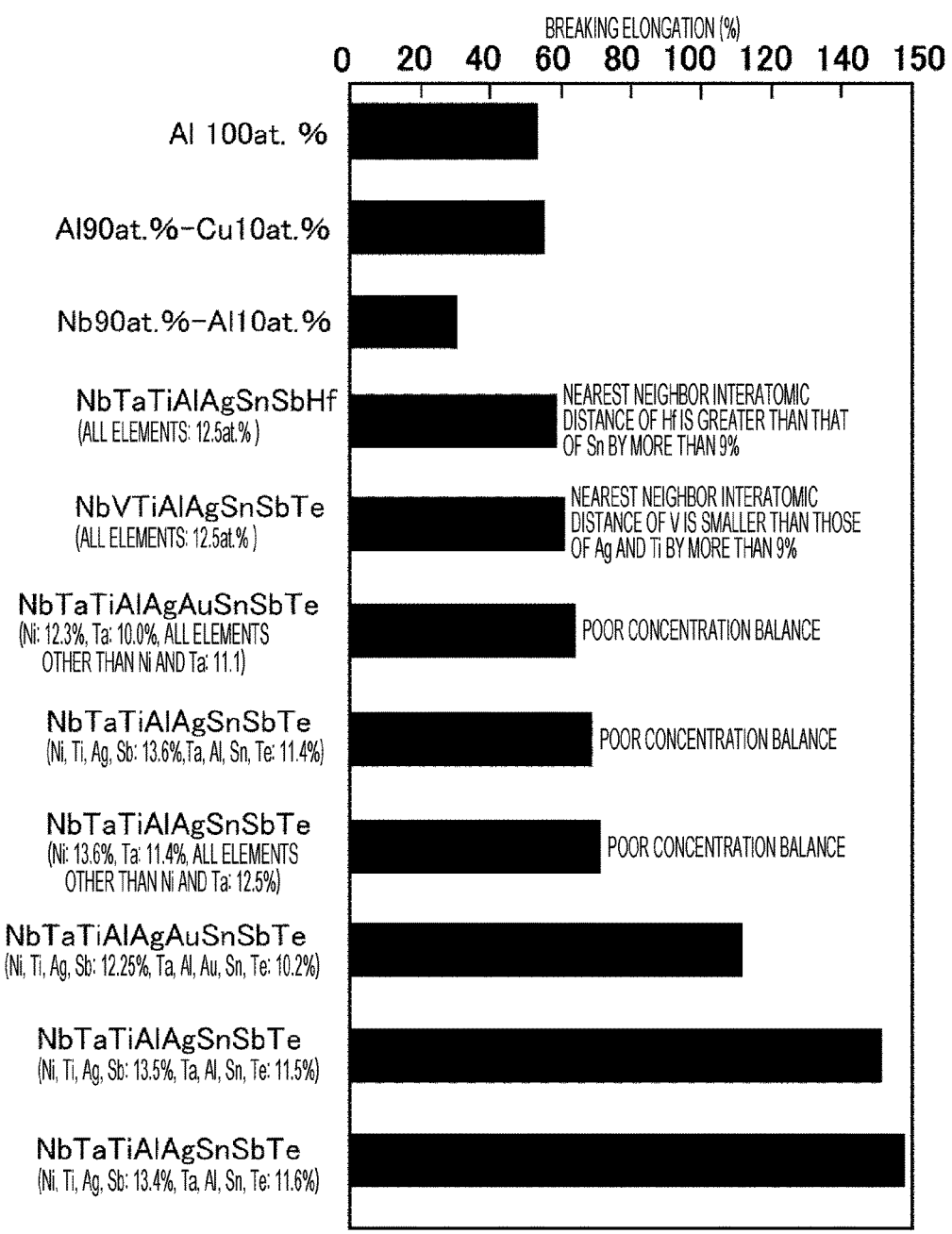
FIG. 8 is a second view showing the simulation results of the breaking elongation of the alloy.
Figure 9:
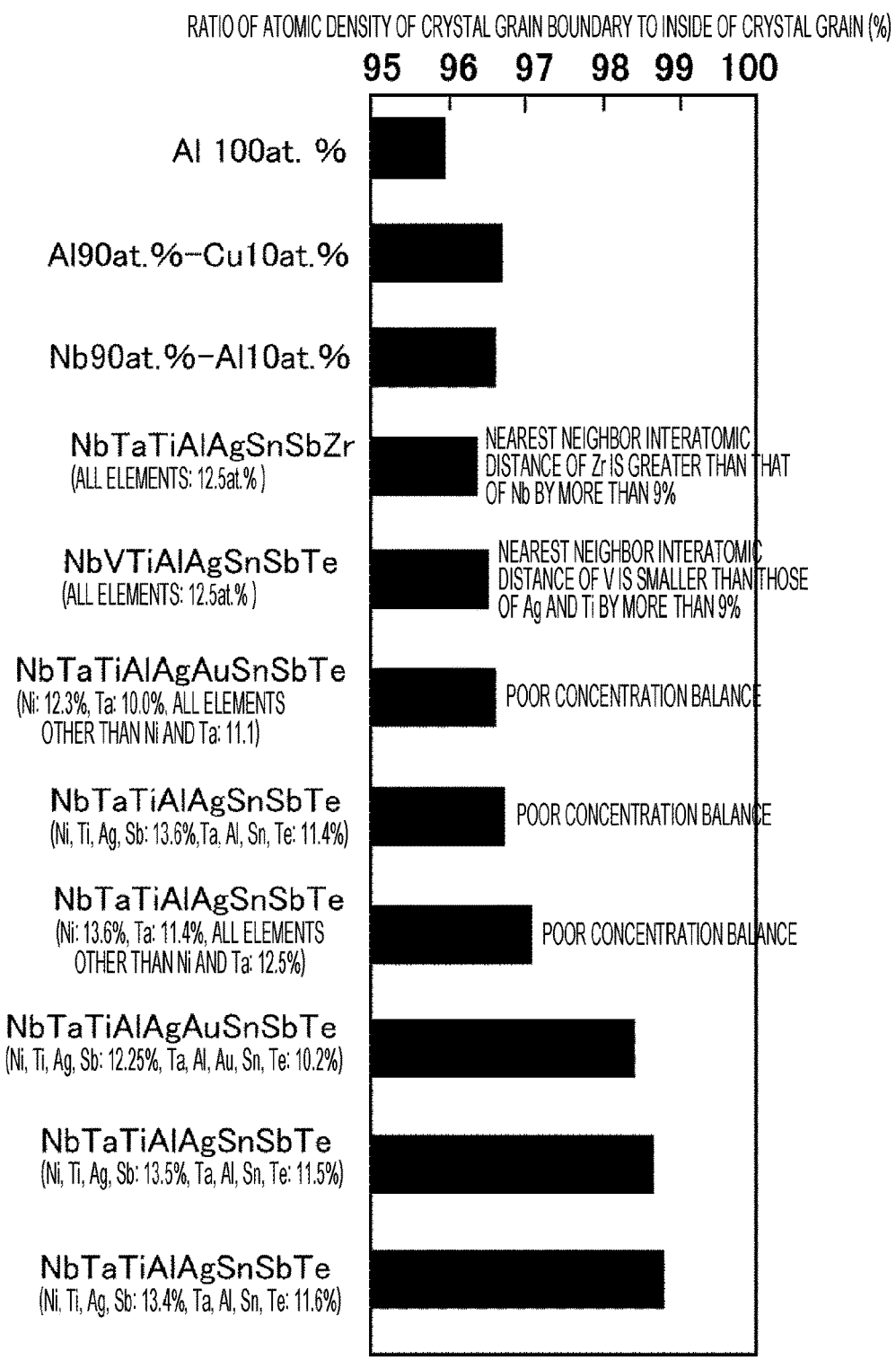
FIG. 9 is a second view showing simulation results obtained by calculating a ratio of the atom density of a crystal grain boundary to the inside of a crystal grain.
Figure 10:
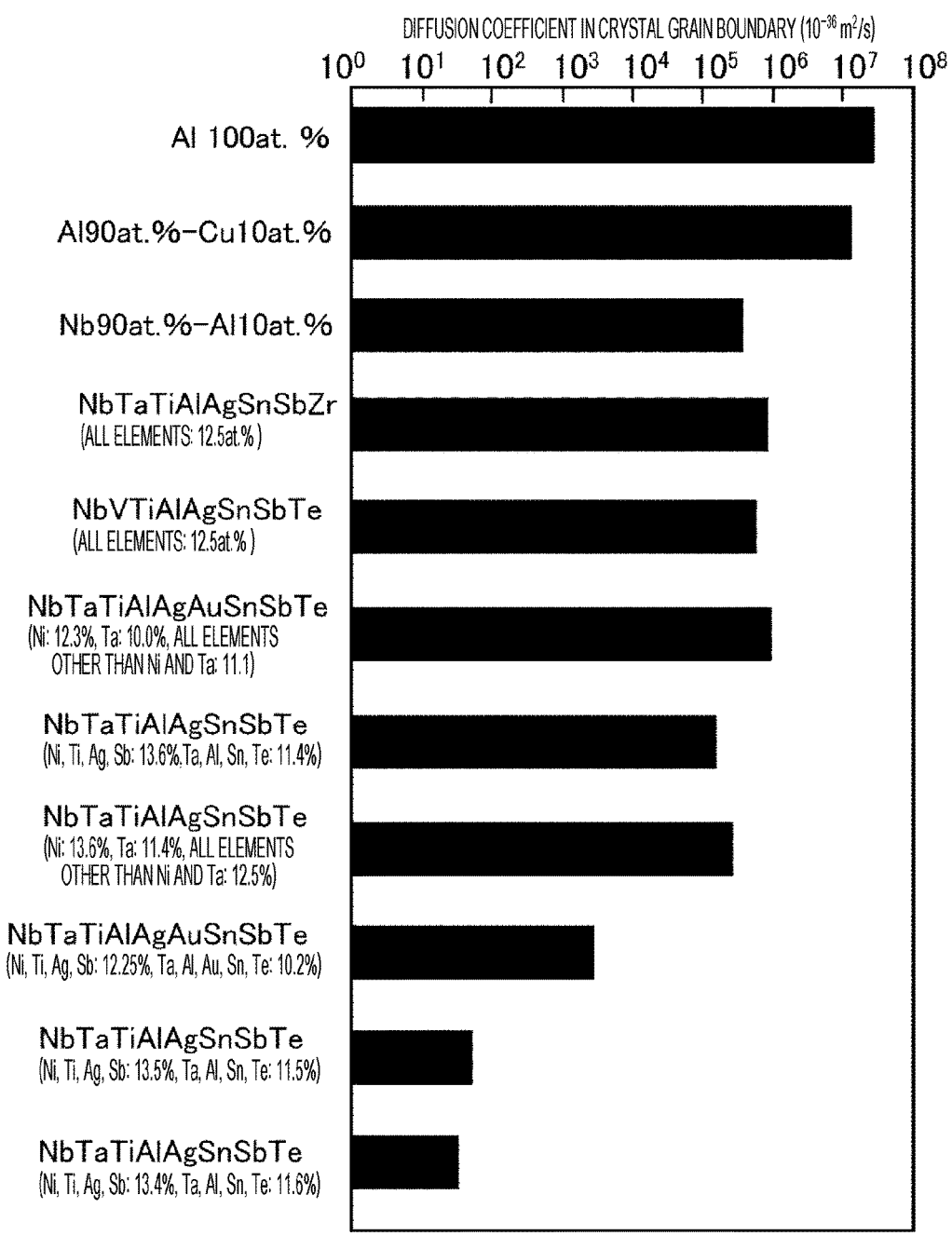
FIG. 10 is a second view showing the simulation results of a diffusion coefficient in the crystal grain boundary of the alloy.

FIG. 8, FIG. 9, and FIG. 10 show the simulation results of the cases of having different constituent elements from the eight types Cu, Ni, Fe, Cr, Co, Ge, Ga, and Si showed to be effective in FIG. 5, FIG. 6, and FIG. 7. From FIG. 8, FIG. 9, and FIG. 10, it is found that eight types of constituent elements Nb, Ta, Ti, Al, Ag, Sn, Sb, and Te are set and the concentration of each of the constituent elements is set to 11.5 at. % to 13.5 at. % is effective in order to increase the breaking elongation.

The crystal structures of the eight types of constituent elements when constituting a bulk crystal from a single element are respectively bcc, bcc, hcp, fcc, fcc, diamond, rhomb, and hex in order as described in p. 27 of Non NPL 2. For the characters of the crystal structures which have not been described above, rhomb represents a rhombohedron structure, and hex represents a hexagonal structure. From FIG. 8, FIG. 9, and FIG. 10, it is found that, even if any of Al and Ag which have a fcc structure is changed to Au having the same fcc structure, the same effect is obtained. Furthermore, it is found that, even if nine types of constituent elements Nb, Ta, Ti, Al, Ag, Au, Sn, Sb, and Te are set by including all of Al, Ag, and Au which have a fcc structure, and the concentration of each of the constituent elements is 10.2 at. % to 12.25 at. %, larger breaking elongation than that of a conventional material can be provided. This provides a slightly low effect. The reason of the slightly low effect is that the three elements Al, Ag, and Au have the same fcc structure, which is slightly apt to cause the limitation of an element which can be arranged in the crystal grain boundary to the three elements. The arrangement of the element which can be placed so as to match the inside of the crystal grain is slightly limited, which causes slight deterioration in densification property.

The nearest neighbor interatomic distances $D_{NN}$ of the nine types of constituent elements Nb, Ta, Ti, Al, Ag, Au, Sn, Sb, and Te when constituting a bulk crystal from a single element are respectively 2.86, 2.86, 2.89, 2.86, 2.89, 2.88, 2.81, 2.91, and 2.86 (unit: angstrom) in order, as described in p. 28 of NPL 2. The relative difference in terms of the largest and smallest nearest neighbor interatomic distances $D_{NN}$ is 4% or lower. This suppresses the strain in the crystal small, and provides the ordered arrangement of atoms.

The relative difference in terms of the nearest neighbor interatomic distances $D_{NN}$ of the nine types Nb, Ta, Ti, Al, Ag, Au, Sn, Sb, and Te is 3% or lower, and is smaller than the relative difference in terms of the eight types Cu, Ni, Fe, Cr, Co, Ge, Ga, and Si. Therefore, as the largest value of the breaking elongation, the values of FIG. 8, FIG. 9, and FIG. 10 are larger than those of FIGS. 5, 6, and 7. As shown also in FIG. 8, FIG. 9, and FIG. 10, when Zr having a large nearest neighbor interatomic distance $D_{NN}$ of 3.17 Å and V having a small nearest neighbor interatomic distance $D_{NN}$ of 2.62 Å are replaced with any of the eight types, the breaking elongation is decreased. Thus, when the difference between the largest and smallest nearest neighbor interatomic distances $D_{NN}$ is more than 9%, the strain is increased to cause the disordered arrangement of atoms, and thereby an effect of decreasing the breaking elongation is lost.

Figure 11:
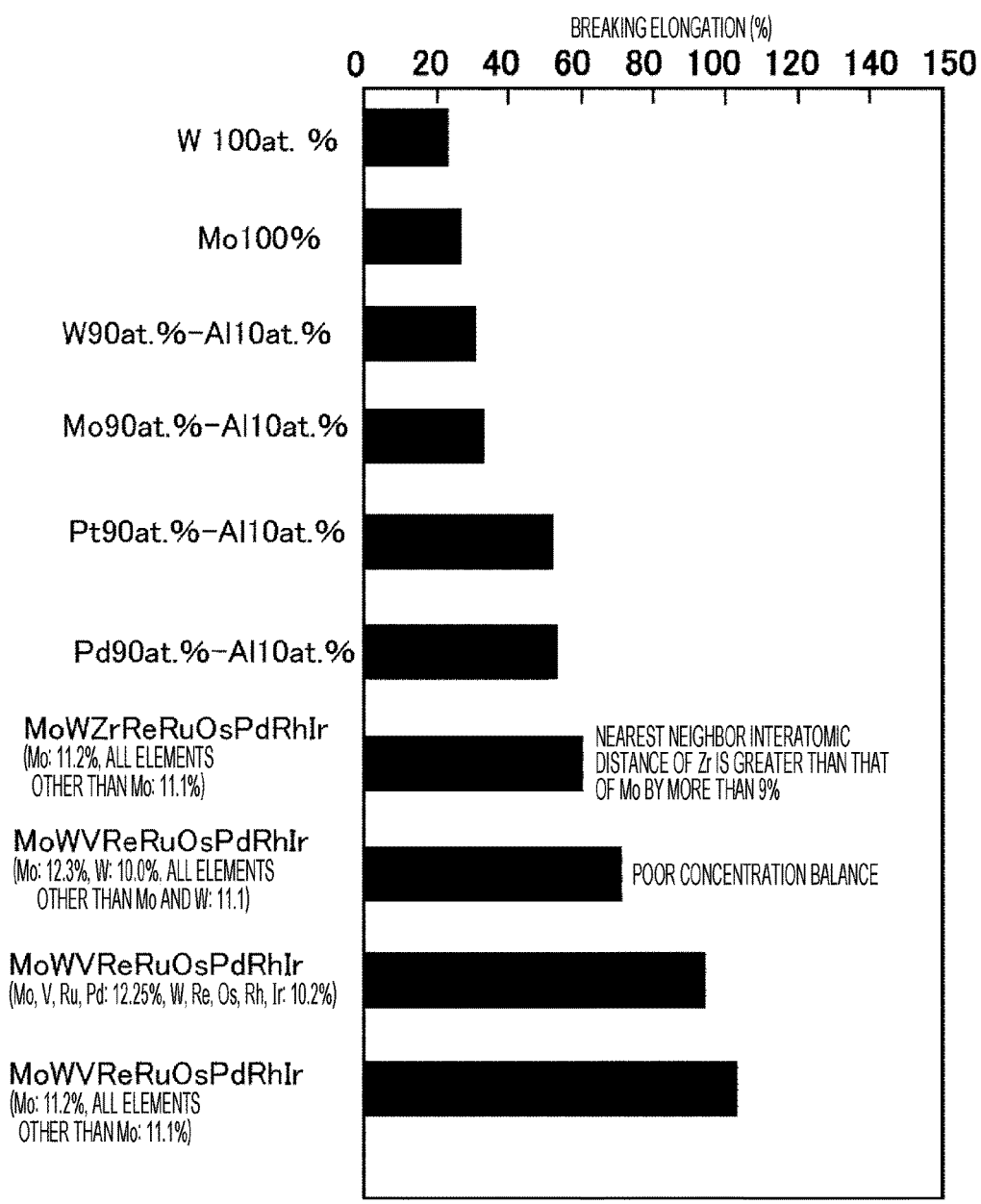
FIG. 11 is a third view showing the simulation results of the breaking elongation of the alloy.
Figure 12:
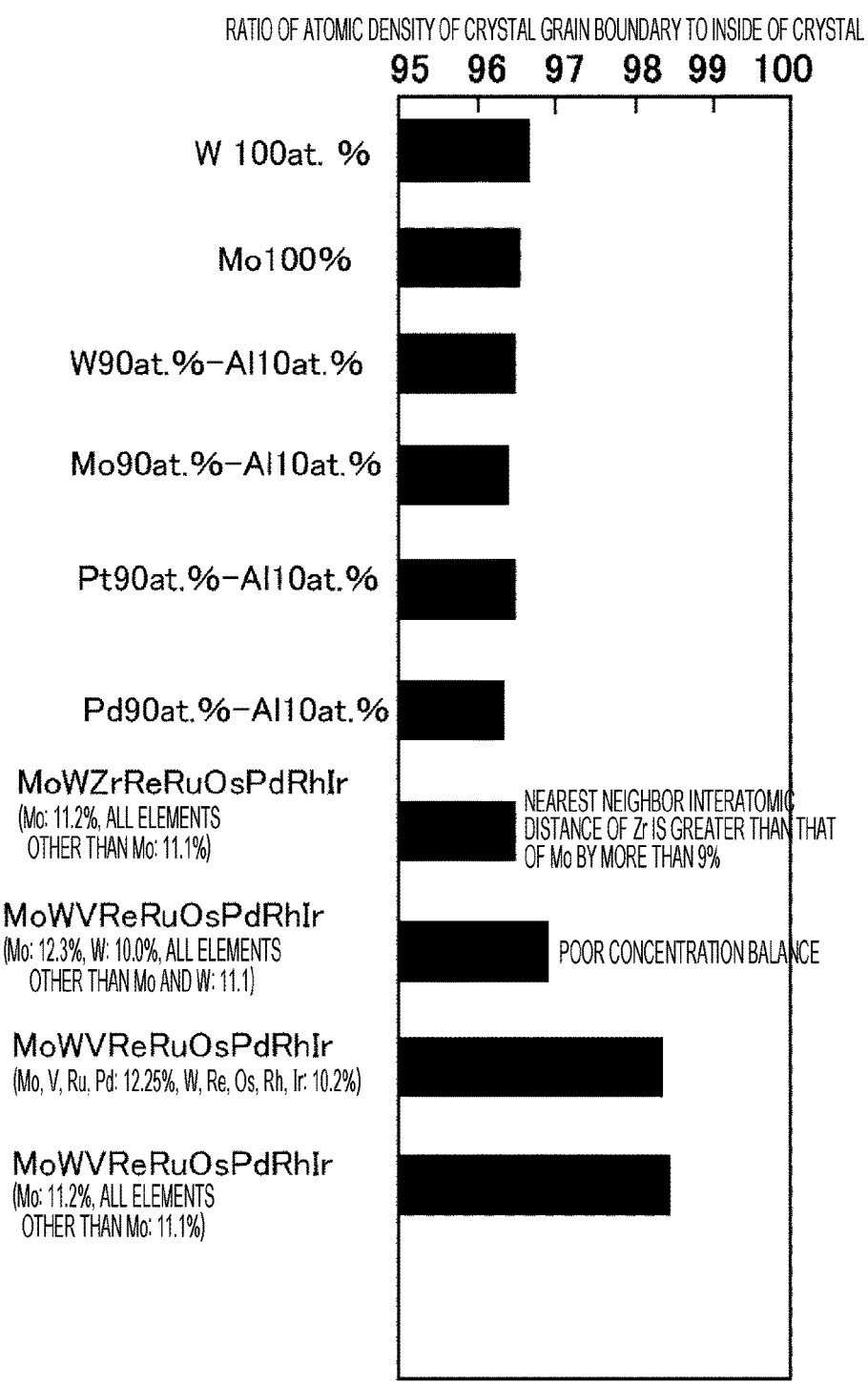
FIG. 12 is a third view showing simulation results obtained by calculating a ratio of the atom density of a crystal grain boundary to the inside of a crystal grain.
Figure 13:
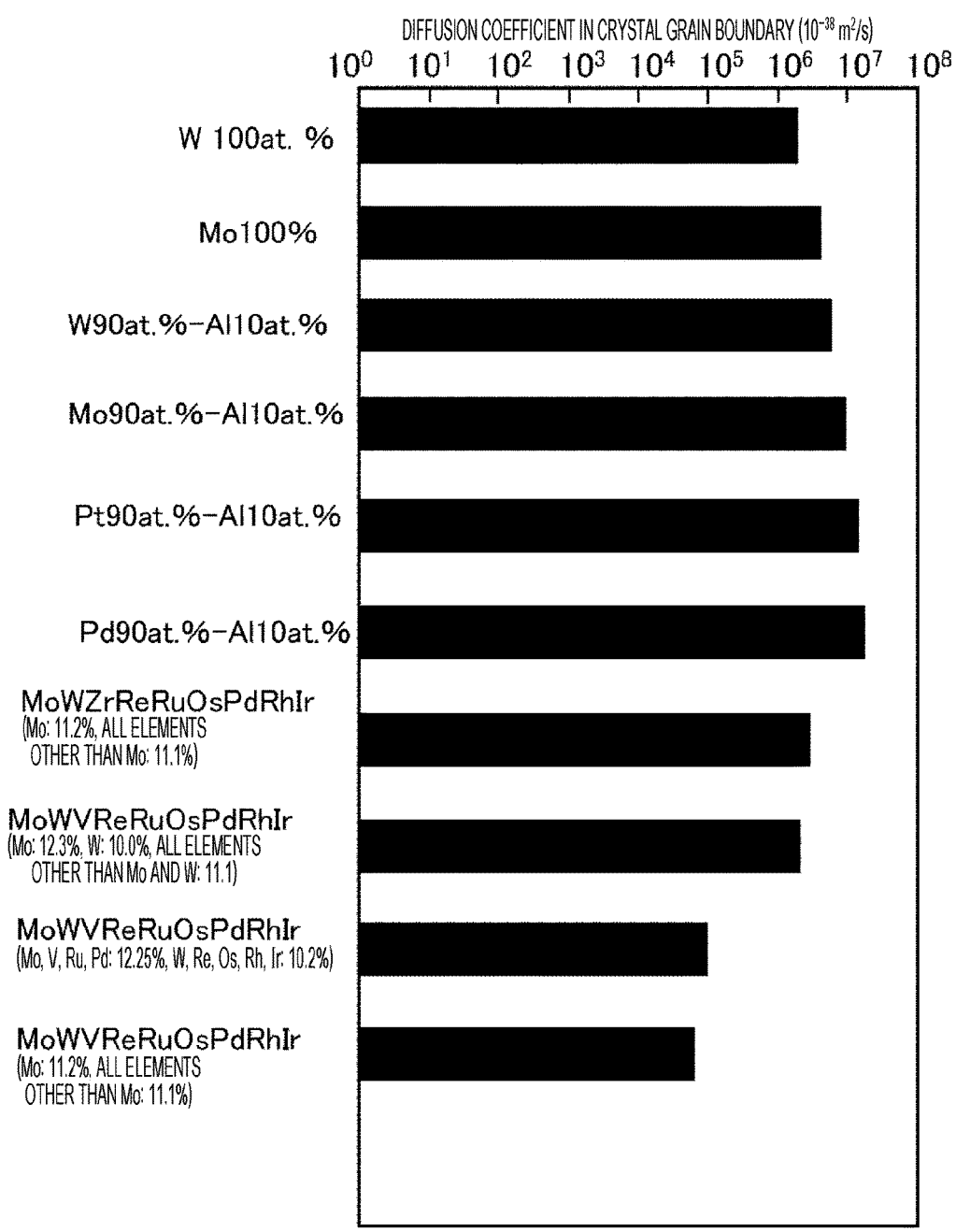

The simulation results of the cases of having different constituent elements from those in FIGS. 5, 6, 7, 8, 9, and 10 are shown in FIG. 11, FIG. 12, and FIG. 13. From FIG. 11, FIG. 12, and FIG. 13, it is found that nine types of constituent elements Mo, W, V, Re, Ru, Os, Pd, Rh, and Ir are set, and the concentration of each of the constituent elements is set to 10.2 at. % to 12.25 at. %, which effectively provides an increase in the breaking elongation. The crystal structures of the nine types of constituent elements when constituting a bulk crystal from a single element are respectively bcc, bcc, bcc, hcp, hcp, hcp, fcc, fcc, and fcc in order, as described in p. 27 of NPL 2. From FIG. 11, FIG. 12, and FIG. 13, it is found that, even if any of Pd, Rh, and Ir having a fcc structure is replaced with Pt having the same fcc structure, the same effect is obtained.

The nearest neighbor interatomic distances $D_{NN}$ of the nine types of constituent elements No, W, V, Re, Ru, Os, Pd, Rh, and Ir when constituting a bulk crystal from a single element are respectively 2.72, 2.74, 2.62, 2.74, 2.65, 2.68, 2.75, 2.69, and 2.71 (unit: angstrom) in order, as described in p. 28 of NPL 2. The relative difference in terms of the largest and smallest nearest neighbor interatomic distances $D_{NN}$ is 5% or lower. This suppresses the strain in the crystal small, and provides the ordered arrangement of atoms. The relative difference in terms of nearest neighbor interatomic distances $D_{NN}$ is 5%, and is smaller than the relative differences in terms of Cu, Ni, Fe, Cr, Co, Ge, Ga, and Si, but only the three types of crystal structures bcc, hcp, and fcc exist. This provides an effect slightly smaller than those in FIGS. 5, 6, and 7.

Example 2

Figure 14:
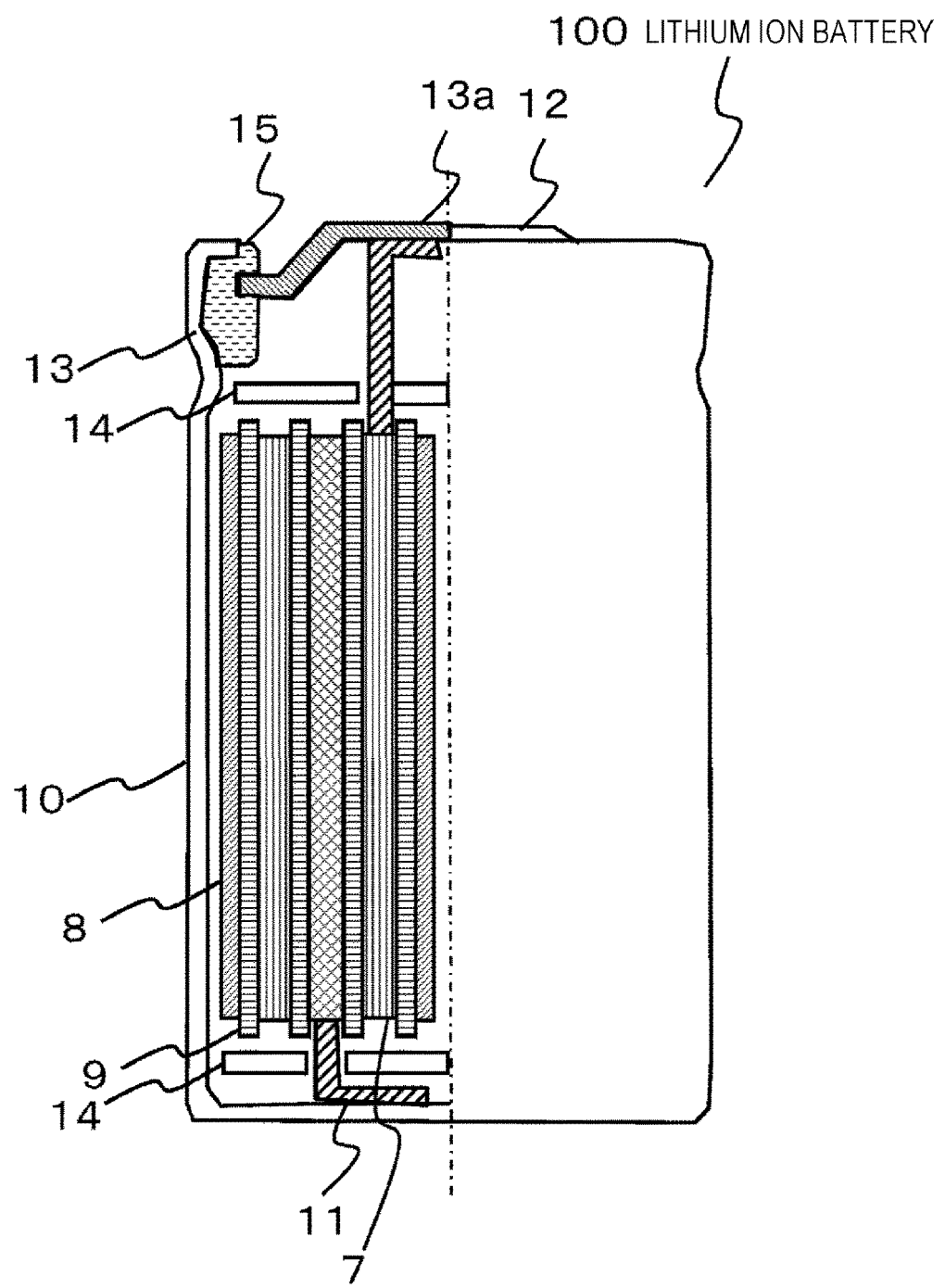
FIG. 14 is a partial sectional view of a lithium ion battery according to the present embodiment.
Figure 15:
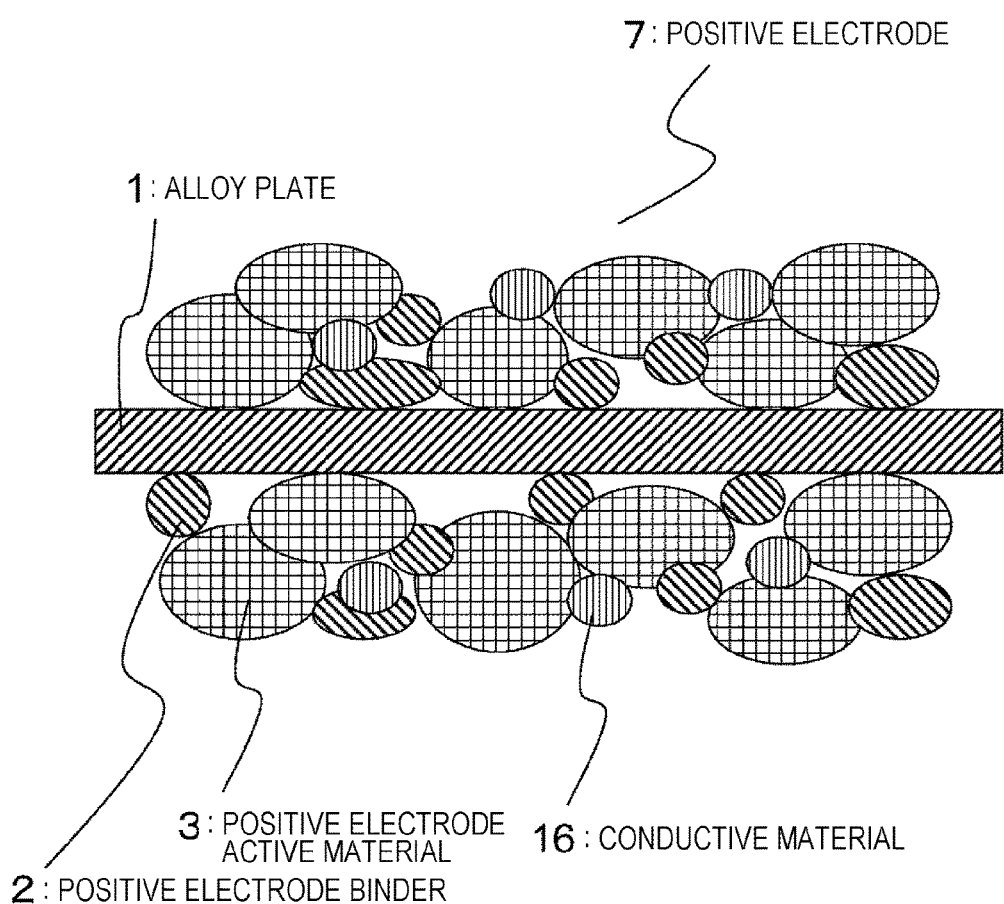
FIG. 15 shows a positive electrode of the lithium ion battery.
Figure 16:
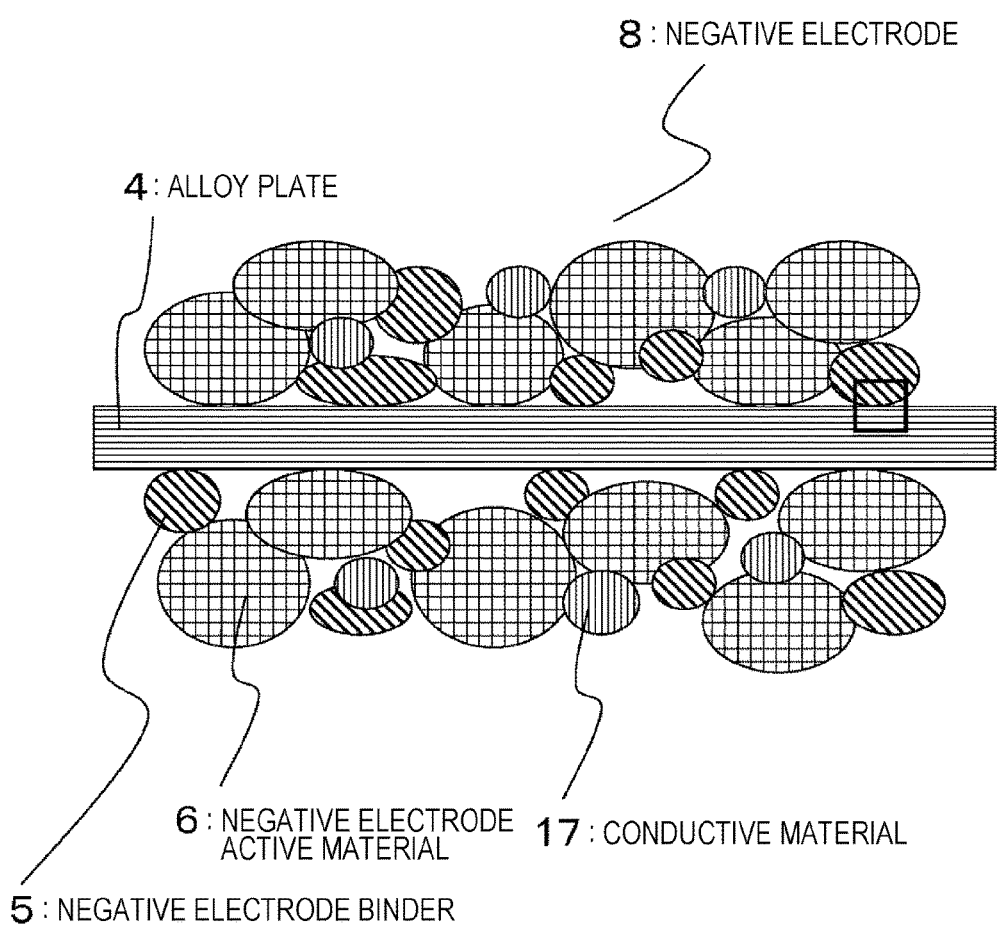
FIG. 16 shows a negative electrode of the lithium ion battery.

Next, the constitution of a lithium ion battery to which a positive electrode 7 is applied will be described with reference to FIG. 14. The positive electrode 7 of a lithium ion battery 100 (hereinafter, merely described as a "battery 100") shown in FIG. 14 includes an alloy plate 1, a positive electrode binder 2, and a positive electrode active material 3 as shown in FIG. 15. Herein, the alloy plate 1 includes a portion to which at least an active material is applied. The portion is made of an alloy having large breaking elongation as shown in Example 1. LiCoO$_2$ or the like is used as the positive electrode active material 3. A negative electrode 8 in FIG. 16 includes an alloy plate 4, a negative electrode binder 5, and a negative electrode active material 6. Herein, the alloy plate 4 is made of an alloy having large breaking elongation as shown in the example 1. The negative electrode active material 6 may be a silicon-containing substance for high capacity published in PTL 2 or the like in addition to carbon to be conventionally used.

The load of the expansion/contraction of a negative electrode active material for high capacity during charge/discharge tends to be increased. By using the alloy having large breaking elongation as shown in Example 1 as the alloy plate 4, the occurrence of the breakage in the alloy plate can be suppressed, which can provide life improvement. The battery 100 includes the positive electrode 7, the negative electrode 8, a separator 9 interposed between the positive electrode 7 and the negative electrode 8, and a nonaqueous electrolyte (not shown) containing a lithium salt, as shown in FIG. 14.

The battery 100 has a cylindrical shape, but the battery 100 may be a square type battery or a laminate type battery, or the like. As described above, the separator 9 is disposed between the positive electrode 7 and the negative electrode 8. This can avoid a contact (short circuit) between the positive electrode 7 and the negative electrode 8. Since the battery 100 has a cylindrical shape, the positive electrode 7, the separator 9, and the negative electrode 8 are layered in this order and are wound around a core member (not illustrated), so that the battery 100 can be formed into the shape illustrated in FIG. 14. The negative electrode 8 can occlude/discharge the lithium ions. Any negative electrode 8, separator 9, nonaqueous electrolyte, and lithium salt can be used, and thus detailed description is omitted.

The battery 100 includes a positive electrode plate lead piece 11, a negative electrode lead piece 12, a battery can 13, a sealed cover part 13a, an insulating plate 14, and a packing 15. The battery can 13 and the sealed cover part 13a are configured from stainless steel (SUS) or the like, for example. The positive electrode plate lead piece 11 electrically connects the positive electrode 7 and the sealed cover part 13a. This enables the battery cover part 13a to function as a positive electrode of the battery 100. The negative electrode lead piece 12 electrically connects the negative electrode 9 and a bottom part of the battery can 13. This enables a main body of the battery can 13 (specifically, the bottom part of the battery can 13) to function as a negative electrode of the battery 100. The battery can 13 and the sealed cover part 13a are electrically insulated by the packing 15. As described above, the battery 100 includes the positive electrode capable of occluding/discharging the lithium ions, the negative electrode capable of occluding/discharging the lithium ions, and the nonaqueous electrolyte including a lithium salt, and thus has a configuration capable of being reversibly charged/discharged.

The alloys of Examples of the present invention described above can be manufactured by melting metals containing constituent elements using an arc melting process, for example, followed by mixing and solidifying. An alloy film may be formed on the surface of a substrate by spraying a metal to the substrate using a thermal spraying process. For example, a conventional copper foil is used for the substrate of the alloy plate 4, and the surface of the copper foil being apt to be broken may be covered with the alloys of Examples of the present invention using the thermal spraying process or the like. Furthermore, the alloys may be manufactured using an additive fabrication process.

REFERENCE SIGNS LIST

1 alloy plate
2 positive electrode binder
3 positive electrode active material layer (solid solution substance)
4 alloy plate
5 negative electrode binder
7 positive electrode
8 negative electrode
9 separator
100 lithium ion battery (battery)

The invention claimed is:

1. An alloy comprising eight or more types of constituent elements, wherein
a relative difference in terms of nearest neighbor interatomic distances $D_{NN}$ between a constituent element having the largest nearest neighbor interatomic distance $D_{NN}$ when constituting a bulk crystal from a single element and a constituent element having the smallest nearest neighbor interatomic distance $D_{NN}$ when constituting a bulk crystal from a single element is 9% or less,
the number of constituent elements having the same crystal structure when constituting a bulk crystal from a single element is not more than 3, and
a difference in concentration between the constituent element having the highest concentration and the constituent element having the lowest concentration is 2 at. % or lower.

2. The alloy according to claim 1, wherein the number of constituent elements having the same crystal structure when constituting a bulk crystal from the single element is not more than 2.

3. The alloy according to claim 2, wherein
the number of the constituent elements is 8, and
the concentration of the constituent elements is 11.5 to 13.5 at. %.

4. The alloy according to claim 3,
wherein the constituent elements are any of the following items (1) to (4):
Cu, Ni, Fe, Cr, Co, Ge, Ga, Si . . . (1);
Nb, Ta, Ti, Al, Ag, Sn, Sb, Te . . . (2);
Nb, Ta, Ti, Al, Au, Sn, Sb, Te . . . (3); and
Nb, Ta, Ti, Ag, Au, Sn, Sb, Te . . . (4).

5. An alloy comprising nine or more types of constituent elements, wherein
a relative difference in terms of nearest neighbor interatomic distances $D_{NN}$ between a constituent element having the largest nearest neighbor interatomic distance $D_{NN}$ when constituting a bulk crystal from a single element and a constituent element having the smallest nearest neighbor interatomic distance $D_{NN}$ when constituting a bulk crystal from a single element is 9% or less,
the number of constituent elements having the same crystal structure when constituting a bulk crystal from a single element is not more than 3, and
the concentration of the constituent elements is 10.2 to 12.25 at. %.

6. The alloy according to claim 5,
wherein the constituent elements are any of the following items (1) to (5):
Nb, Ta, Ti, Al, Ag, Au, Sn, Sb, Te . . . (1);
Mo, W, V, Re, Ru, Os, Pd, Rh, Ir . . . (2);
Mo, W, V, Re, Ru, Os, Pd, Rh, Pt . . . (3);
Mo, W, V, Re, Ru, Os, Pd, Pt, Ir . . . (4); and
Mo, W, V, Re, Ru, Os, Pt, Rh, Ir . . . (5).

7. A lithium ion battery comprising a positive electrode capable of occluding and discharging lithium ions, a negative electrode capable of occluding and discharging lithium ions, and a nonaqueous electrolyte including a lithium salt, and capable of being reversibly charged/discharged, wherein
the positive electrode includes a positive electrode metal plate and a positive electrode active material formed on a surface of the positive electrode metal plate,
the negative electrode includes a negative electrode metal plate and a negative electrode active material formed on a surface of the negative electrode metal plate, and
at least a part of at least one of the positive electrode metal plate and the negative electrode metal plate is made of the alloy according to claim 1.

* * * * *